Oct. 13, 1959  E. N. JONES  2,908,525
WIRE LINE RELEASABLE SLIP-TYPE FISHING TOOL
Filed May 31, 1956  3 Sheets-Sheet 1
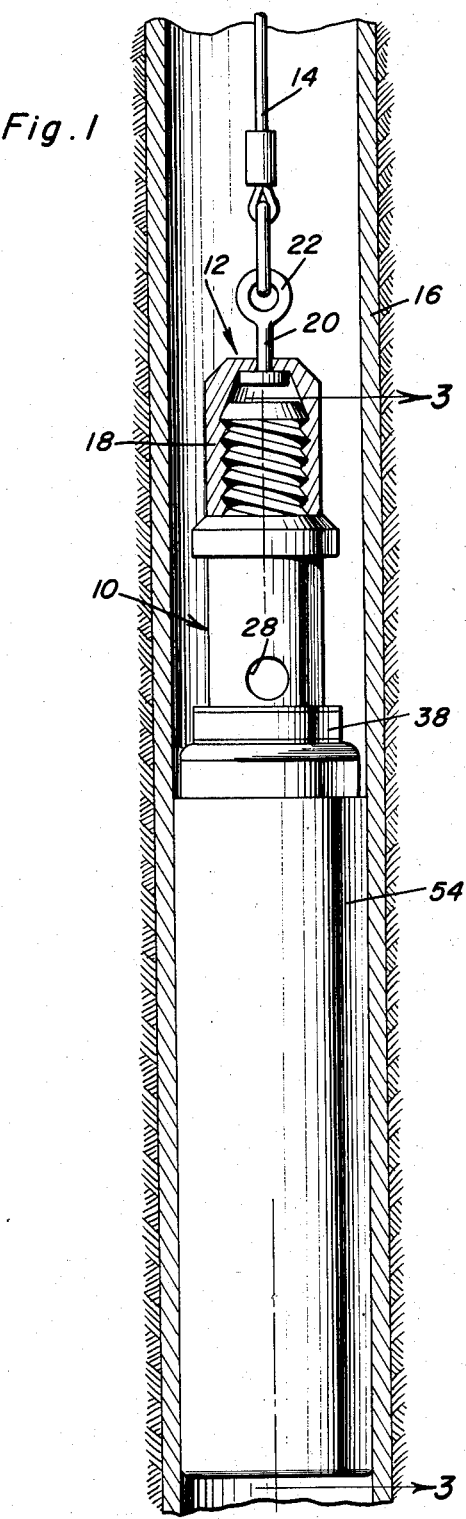
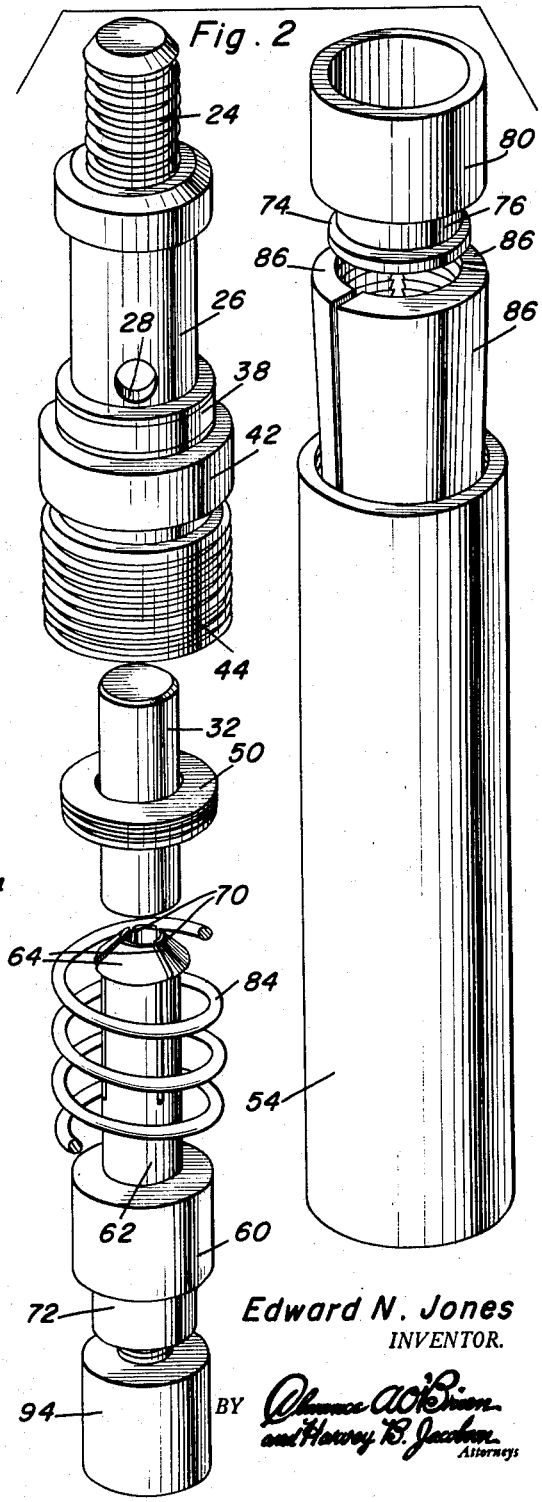
Edward N. Jones
INVENTOR.

Oct. 13, 1959 E. N. JONES 2,908,525
WIRE LINE RELEASABLE SLIP-TYPE FISHING TOOL
Filed May 31, 1956 3 Sheets-Sheet 2

Edward N. Jones
INVENTOR.

BY *[signatures]*
Attorneys

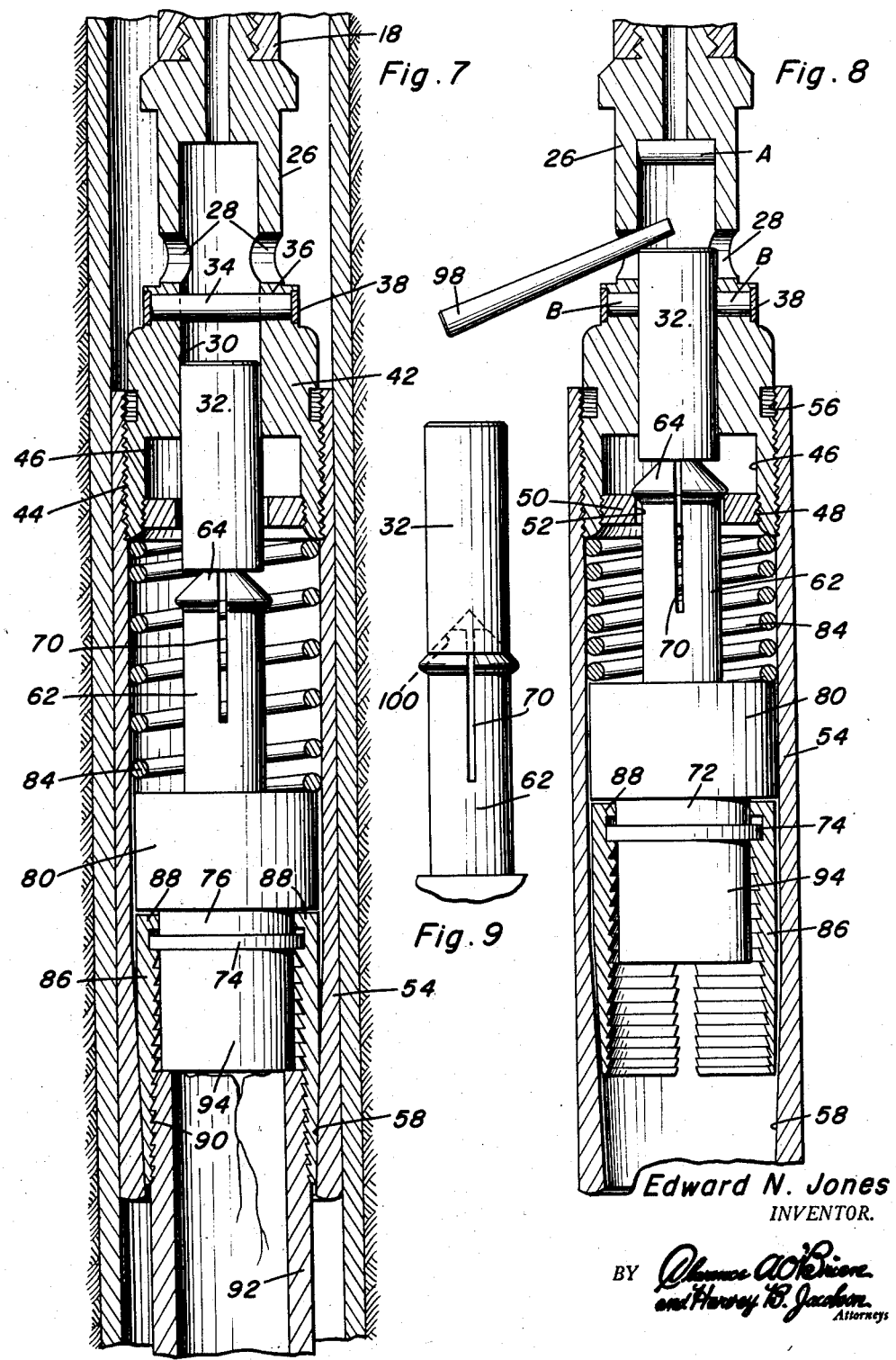

United States Patent Office 2,908,525
Patented Oct. 13, 1959

2,908,525
WIRE LINE RELEASABLE SLIP-TYPE FISHING TOOL

Edward N. Jones, Pettus, Tex.

Application May 31, 1956, Serial No. 588,536

5 Claims. (Cl. 294—102)

This invention comprises a novel and useful wire line releasable slip-type fishing tool, and more specifically relates to a tool adapted to be run upon a wire line for retrieving lost articles in wells, and which may be selectively released from an article which cannot be withdrawn by the tool.

The primary object of this invention is to provide a fishing tool having resilient slips therein together with means associated with the slips for limiting the extent to which the fish to be captured by the tool can penetrate into the slips.

A further object of the invention is to provide a fishing tool in accordance with the foregoing object wherein a hammering action can be applied to the fish engaged in the slips for jarring and releasing the fish from its engagement in a well bore to facilitate the removal of the fish therefrom.

Yet another object of the invention is to provide a fishing tool in accordance with the preceding objects wherein the slips may be selectively released from the fish in the well bore, and the tool withdrawn, as when the toop is engaged upon a fish and cannot withdraw or free the same.

A still further important object of the invention is to provide a fishing tool of the slip-type in accordance with the foregoing objects wherein the slips may be readily released from the fish after the latter has been withdrawn from the well bore.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in vertical section through a portion of a well bore casing showing the fishing tool in accordance with this invention applied to a wire line, the swivel connection of the tool to the wire line being shown in vertical section;

Figure 2 is a group perspective view illustrating the various elements forming the fishing tool;

Figure 7 is a view similar to Figure 3 but showing certain of the elements of the tool in elevation, and illustrating the manner in which the slips are engaged upon a fish to be withdrawn by the tool;

Figure 3:
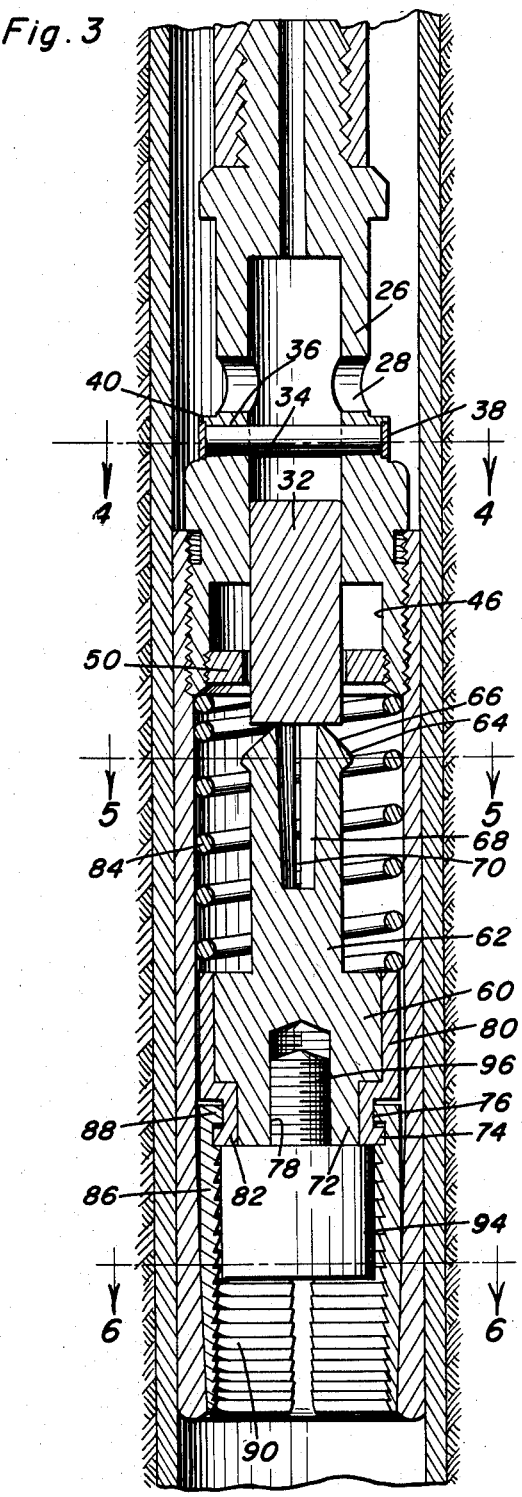
Figure 3 is a view in vertical central section, taken upon an enlarged scale substantially upon the plane indicated by the section line 3—3 of Figure 1 and showing the internal construction of the fishing tool, the latter being shown in its slip closing position.

Figure 8 is a view similar to Figure 3 but showing the position of the parts when the slips are in their released position, and illustrating further the manner in which the slips are restored to their engaging position; and Figure 9 is a view in elevation, certain concealed parts being shown in dotted lines, and further illustrating the relationship between the strip actuating means and a plunger for actuating the same.

In retrieving fish in the form of tools or portions of tools and other objects which are lost or frozen in a well bore, it is desirable that the fishing tool be capable of imparting a series of blows, jars or shocks to the fish in order to loosen the same preparatory to removing it from the well bore; and if the fish cannot be retrieved, to be capable of release from the article to permit the fishing tool to be withdrawn and other means provided for recovering or drilling through the fish. It is therefore the principal aim of this invention to provide a fishing tool capable of all of these functions and in a greatly improved manner.

In the accompanying drawings, the fishing tool in accordance with this invention is designated generally by the numeral 10, and is shown as being connected as by a swivel 12 to a wire line 14, for operation in a casing or tubing 16 disposed in a well bore.

Figure 4:
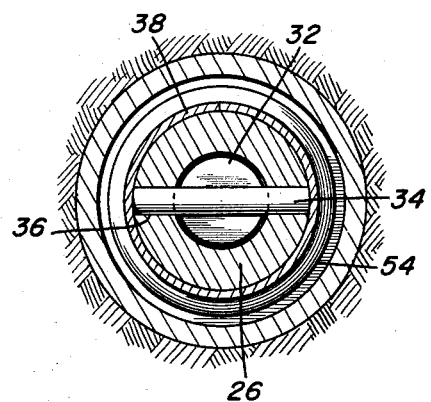
Figures 4–6 are horizontal sectional detail views taken respectively upon the plane indicated by section line 4—4, 5—5 and 6—6 respectively of Figure 3 and showing various internal details of the construction of the fishing tool.

As will be observed from Figure 1, the swivel 12 consists of an internally threaded sleeve 18 having a closed and apertured upper end through which extends a bolt or swivel fastener 20 having an eye 22 by which the same is secured to the cable 14. It will thus be apparent that the sleeve can freely turn or swivel upon its fastener 20. The internally threaded sleeve 18 is engaged upon the screw threaded diametrically reduced upper extremity 24 of a sleeve-like body 26. The latter is preferably provided with diametrically disposed apertures 28 for a purpose which will become subsequently apparent. The tubular body 26 is provided with an axially disposed bore 30 therein and a piston or plunger 32 is freely slidable within this bore, being limited as to its upward travel therein by a shear pin 34 disposed in diametrically positioned apertures 36 in the sleeve 26, and being releasably retained therein as by a split ring 38. The location of this split ring in a circumferentially extending channel or groove 40 in the exterior surface of the sleeve 26 is more clearly shown in Figure 4. The primary function of this split ring is to retain the shear pin in the bore, and after the pin has been sheared by the plunger or piston 32 as set forth hereinafter, to prevent the severed extremities of the shear pin from dropping into the bore 30.

At its lower end the sleeve 26 is provided with a diametrically enlarged portion 42 which is externally threaded as at 44, and is provided with a cavity or chamber 46 which is internally threaded as at 48.

Adjustably positioned in the chamber 46 is a centrally apertured externally threaded retaining ring 50 which by means of threaded engagement is vertically adjustable with respect to the chamber, the central aperture of this ring being indicated at 52. Secured to the screw threads 44 of the enlarged portion 42 is a cage or barrel 54 having internal threads 56 at its upper extremity, and having an open lower extremity.

The internal surface of the lower extremity has a downwardly converging taper 58 for a purpose to become subsequently apparent.

Figure 5:
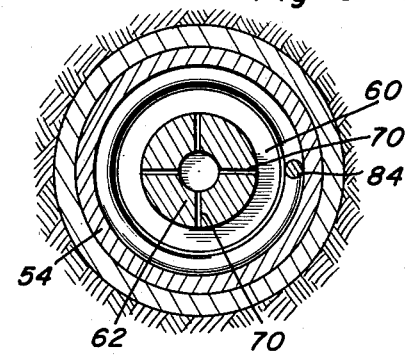
Figure 6:
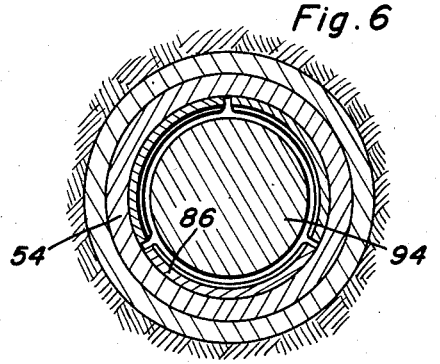

Freely slidable upon the cylindrical interior surface of the barrel 54 is a cylindrical member 60 having a diametrically reduced cylindrical upstanding neck 62 provided with a headed or diametrically enlarged upper portion 64 having a conical top surface 66. The neck is axially bored as at 68 and is longitudinally slitted as at 70 to impart radial resiliency to the neck. The construction of the neck portion is shown in Figure 5.

At its lower end the body 60 is diametrically reduced to provide a cylindrical portion 72. There is also provided an internally threaded axial bore 78 opening upwardly from the bottom surface of the portion 72.

Loosely embracing the body 60 is a sleeve 80 which likewise is loosely received within the barrel 54 for sliding movement therein. At its lower end, this sleeve is diametrically reduced and its lower end is provided with a diametrically enlarged ridge or flange 74 thus providing a circumferentially extending channel or groove 76. A compression spring 84 surrounds the neck 62 and its upper end abuts against the bottom of the portion 42, or if desired against the bottom surface of the retaining ring 50, while its lower end abuts against the top surface of the sleeve 80.

A plurality of slips 86 are provided, each having at its upper end an outer surface of arcuate extent, and having an inturned arcuate flange 88 receivable in and thus carried by the circumferential groove 76 and the flange 74. The internal surface of the slips are provided with circumferentially extending knife-edged ridges or teeth 90 adapted to engage and grip a fish or object to be withdrawn by the fishing tool, while the exterior surface of the slips is appropriately tapered to cooperate with the tapered surface 58 whereby when the slips are lowered in the barrel, as from the position shown in Figure 8 to the position shown in Figures 3 and 7, the slips may be radially contracted and caused to grip or engage upon a fish such as the piece of pipe 92, in the manner shown in Figure 7.

Disposed within the slips and secured to the body 60 is a stop member 94 which may be in the form of a cylindrical block having an upwardly projecting axially disposed externally threaded stem 96 engageable in the threaded bore 78.

From the foregoing, it is believed that the operation of the tool will be now understood. When it is desired to recover a fish from a well bore, the tool attached to the wire line as shown in Figure 1 is lowered into the well until the lower end of the barrel contacts and embraces the fish such as that shown at 92. The body 62 will at this time be in the position shown in Figure 3, with the slips in their lowered or closed position by virtue of the thrust of the spring 84. As the tool is lowered, the weight applied to the tool will cause the barrel and the slips to embrace and slide over the upper end of the fish 92 until the penetration of the fish into the slips is limited by engagement of the upper end of the fish with the stop member 94, as shown in Figure 7. During this penetration of the fish into the slips, it will be understood that the latter are moved upwardly in the barrel against the resistance of the spring 84, and as the slips are moved upwardly, the radial compressive squeezing action of the tapered surface 58 of the barrel upon the exterior of the slips is released, permitting the slips to open by an outward pivoting of the same upon the flange 88 in the groove 76.

As will be observed, the actual upward movement of the slip is limited by the abutment of the neck 62 against the plunger 32, and by the abutment of the latter against the shear pin 34. As will be understood, various sizes of stops 94 may be provided to adjustably limit the penetration of the fish into the slips, in accordance with the particular object to be retrieved by the fishing tool. In order to adapt the tool for different objects it is merely necessary to employ a selected one in a series of different sized stop members 94, and/or a selected one of a series of interchangeable slips 86 having various dimensions and characteristics.

As will be evident, once the slips have been engaged upon the fish, an upward pull may be applied to the latter through the cable 14. If the fish can be thus retrieved from its lodgement in the well bore, the same may be withdrawn with the tool from the bore, and the fish may then be removed from the tool in a manner to be subsequently set forth.

However, if the fish is frozen in the bore, it is possible to apply a hammering action to the same as by lifting and releasing the cable 14. This, through the member 26, shear pin 34, plunger 32 and neck 62, and the lost motion provided between the shear pin 34 and plunger 32 will impart a series of blows to the top of the fish by the stop means 94. If this is effective to dislodge the fish, the same may then be retrieved from the well bore in the same manner as described hereinbefore.

However, if despite such blows it is impossible to dislodge the fish, and it is desired to disengage the tool from the fish, in order to withdraw the tool and permit other methods to be employed for removing the fish from the bore, a blow or series of blows of sufficient magnitude may be given to the top of the tool to cause the plunger 32 to shear the pin 34. When this occurs, the force applied to the top of the tool will force the plunger 32 upwardly, carrying with it the sheared central portion A of the pin 34, and leaving the two severed ends B in the diametrically disposed bore 36. At the same time, the upward forcing of the plunger 32 by the neck 62 causes the resiliently radially expansible enlarged head portion 64 to be squeezed through the opening 52, and then to expand thereabove to lock the neck portion and the member 62 in their raised position with the spring 84 being compressed thereby, as shown in Figure 8. In this upward position, the slips are moved above the compressing surface 58 and are radially expanded to cause the same to disengage from and release the fish, whereby the tool can be readily withdrawn from the well bore.

After the tool has been withdrawn to the surface, the fish can be readily removed therefrom without dismantling or disassembling the tool. If the fish is still hooked by the tool, as in the position of Figure 7, it is merely necessary to apply further pressure to the lower end of the fish and thereby force the tool upwardly until the headed portion 64 is snapped over the retaining ring 50 in the position shown in Figure 8, whereby the fish may be removed from the tool.

With the slips in their raised and locked position as shown in Figure 8, as when the fish has been released from the tool by forcing the latter upwardly, after the shear pin has been removed or until the shear pin is severed, or after the pin has been severed in the well bore and the tool withdrawn without the fish, the device may be reset for use as by inserting a tool 98 in the openings 28 and pressing downwardly upon the plunger 32. As shown in dotted lines in Figure 9, the bottom surface of the plunger 32 is provided with a conical recess 100 therein which receives and is complementary to the conical upper surface 66 of the headed portion of the neck 62. The downward pressure of the tool 98 upon the plunger 32 causes the conical surfaces of the plunger and headed portion of the neck to radially contract the plunger until the flange 64 thereof will clear the wall of the bore 52 and permit the spring 84 to move the neck portion out of the locking ring. Accordingly, the tool then returns to the position of Figure 3 and is again ready for use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing tool comprising a barrel, a first member fixedly secured in the upper end of said barrel, a second member slidably received in the mid-portion of said barrel, radially expansible and contractible longitudinally slotted slips slidable in the lower end of said barrel, hook means operatively connecting said slips to said second member for movement therewith, wedge means carried by and cooperating with said barrel and slips for effecting radial contraction of the latter in response to downward movement thereof in the barrel and permitting radial expansion of the slips upon upward movement thereof in said barrel, a plunger freely slidable in said first member and engageable with a portion of said second member, a shear pin in said first member disposed above and engageable by said plunger whereby downward movement of the first member will through said shear pin cause the plunger to apply force downwardly upon said portion of said second member.

2. A fishing tool comprising a barrel, a first member fixedly secured in the upper end of said barrel, a second member slidably received in the mid-portion of said barrel, radially expansible and contractible longitudinally slotted slips slidable in the lower end of said barrel, hook means operatively connecting said slips to said second member for movement therewith, wedge means carried by and cooperating with said barrel and slips for effecting radial contraction of the latter in response to downward movement thereof in the barrel and permitting radial expansion of the slips upon upward movement thereof in said barrel, a plunger freely slidable in said first member and engageable with a portion of said second member, a shear pin in said first member disposed above and engageable by said plunger whereby downward movement of the first member will through said shear pin cause the plunger to apply force downwardly upon said portion of said second member, a spring operatively interposed between the first and second members for yieldingly urging the latter and the slips downwardly in the barrel.

3. The combination of claim 1 including a retainer recess in said first member said portion of said second member having a radially contractible and expansible neck with a projection thereon cooperating with said recess for securing the second member in a relatively raised position in said barrel when said projection is engaged in said recess.

4. The combination of claim 1 including a retainer screw threadedly engaged in said barrel above said second member and having an aperture therein, said portion of said second member having a radially resilient neck slidably passable through said aperture, a locking flange on said neck of normally greater diameter than that of said aperture whereby said flange may be passed upwardly through said aperture when radially compressed and will prevent withdrawal of said neck from said aperture when the former is expanded.

5. The combination of claim 4 wherein said portion of said second member has a conical surface upon its upper end, said plunger having a recess for receiving said conical surface and radially comprising said neck upon movement of said neck and plunger towards each other.

References Cited in the file of this patent

UNITED STATES PATENTS

| | | |
|---|---|---|
| 575,748 | Williamson | Jan. 26, 1897 |
| 2,122,602 | Beck | July 5, 1938 |
| 2,309,310 | Gratehouse | Jan. 26, 1943 |
| 2,652,281 | Hunt et al. | Sept. 15, 1953 |
| 2,693,981 | Schmitt | Nov. 9, 1954 |
| 2,745,693 | McGill | May 15, 1956 |
| 2,753,208 | Le Bus | July 3, 1956 |